US012169790B2

(12) United States Patent
Yamamoto (10) Patent No.: US 12,169,790 B2
(45) Date of Patent: Dec. 17, 2024

(54) ABDUCTION APPARATUS, ABDUCTION METHOD, AND COMPUTER-READABLE RECORDING MEDIUM

(71) Applicant: NEC Corporation, Tokyo (JP)

(72) Inventor: Kazeto Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 975 days.

(21) Appl. No.: 17/269,359

(22) PCT Filed: Aug. 27, 2018

(86) PCT No.: PCT/JP2018/031624
§ 371 (c)(1),
(2) Date: Feb. 18, 2021

(87) PCT Pub. No.: WO2020/044415
PCT Pub. Date: Mar. 5, 2020

(65) Prior Publication Data
US 2021/0312309 A1 Oct. 7, 2021

(51) Int. Cl.
*G06N 5/04* (2023.01)
*G06F 17/18* (2006.01)

(52) U.S. Cl.
CPC ............. *G06N 5/041* (2013.01); *G06F 17/18* (2013.01)

(58) Field of Classification Search
CPC ........... G06N 5/041; G06N 7/01; G06F 17/18
See application file for complete search history.

(56) References Cited

U.S. PATENT DOCUMENTS 7,991,718 B2 * 8/2011 Horvitz ..................... G06N 5/04
706/21
10,318,917 B1 * 6/2019 Goldstein ............. G06Q 20/203
11,048,737 B2 * 6/2021 Kalyanpur ............ G06F 16/334
(Continued)

FOREIGN PATENT DOCUMENTS

JP 2016-505953 A 2/2016

OTHER PUBLICATIONS

Sheila A. McIlraith, "Logic-Based Abductive Inference". Stanford University, 1998. pp 1-29 (Year: 1998).*
(Continued)

*Primary Examiner* — Hien L Duong
(74) *Attorney, Agent, or Firm* — Sughrue Mion, PLLC (57) ABSTRACT

An abduction apparatus 1 includes: a probability calculation unit 2 configured to calculate, with respect to each of candidate hypotheses generated using observation information and knowledge information, a probability that the candidate hypothesis is an explanation regarding the observation information; a closed world assumption probability calculation unit 3 configured to calculate, with respect to the candidate hypotheses, a closed world assumption probability that the candidate hypothesis is an explanation regarding a first-order predicate logic literal to which a new truth value is determined as a result of assuming a closed world assumption; and a solution hypothesis determination unit 4 configured to determine a solution hypothesis that is a best
(Continued)

explanation regarding the observation information from the candidate hypotheses using the probability and the closed world assumption probability.

14 Claims, 9 Drawing Sheets

(56) References Cited

U.S. PATENT DOCUMENTS

| | | | | |
|---|---|---|---|---|
| 2004/0243409 A1* | 12/2004 | Nakagawa | ............ | G06F 40/268 704/240 |
| 2009/0006297 A1* | 1/2009 | Horvitz | ................... | G06N 5/04 706/46 |
| 2011/0173000 A1* | 7/2011 | Yamamoto | .......... | G10L 15/1815 704/E15.001 |
| 2014/0324750 A1 | 10/2014 | Christophe et al. | | |
| 2015/0006458 A1* | 1/2015 | Zadka | ................... | G06N 5/022 706/47 |
| 2016/0071022 A1* | 3/2016 | Bruno | ................... | G06N 20/00 706/12 |
| 2017/0024659 A1* | 1/2017 | Stromsten | ......... | G06F 16/24578 |
| 2018/0157641 A1* | 6/2018 | Byron | ..................... | G06F 16/23 |
| 2019/0311274 A1* | 10/2019 | Byron | ................... | G06N 5/022 |
| 2021/0241148 A1* | 8/2021 | Yamamoto | ............. | G06N 5/041 |

OTHER PUBLICATIONS

Eiter et al., "The complexity of Logic-Based Abduction". ACM 1995, pp. 3-42 (Year: 1995).*
English translation of Written opinion for PCT Application No. PCT/JP2018/031624, mailed on Nov. 27, 2018.
International Search Report for PCT Application No. PCT/JP2018/031624, mailed on Nov. 27, 2018.
Naoya Inoue and Andrew S. Gordon, "A Scalable Weighted Max-SAT Implementation of Propositional Etcetera Abduction", Proceedings of the 30th International Florida Artificial Intelligence Research Society Conference (FLAIRS), op. 62-67, May 2017.
Rohit J. Kate and Raymond J. Mooney, "Probabilistic Abduction Using Markov Logic Networks", Proceedings of IJCAI-09 Workshop on Plan, Activity, and Intent Recognition, Jul. 2009, USA.
Kazunori Fujimoto et al., "A New Approach to Quantitate "Likelihood" of Conclusions Using Logical Structures of Rules", IPSJ SIG Technical Report, vol. 36, No. 8, pp. 2071-2074, Aug. 15, 1995, Japan.
Japanese Office Action for JP Application No. 2020-539882 mailed on Mar. 1, 2022 with English Translation.

* cited by examiner

QUERY LOGICAL FORMULA: D1 bird(A) ∧ swim(A)

BACKGROUND KNOWLEDGE: D2 bird(x) ⇒ fly(x)$^{0.9}$
penguin(x) ⇒ bird(x)$^{0.9}$
penguin(x) ⇒ swim(x)$^{0.9}$
fish(x) ⇒ swim(x)$^{0.9}$
penguin(x) ∧ fly(x) ⇒ ⊥$^{0.9}$

| NODE ID | LOGICAL FORMULA |
|---|---|
| 0 | bird(A) |
| 1 | swim(A) |
| 2 | fly(A) |
| 3 | penguin(A) |
| 4 | fish(A) |

82

| RULE ID | INFERENCE RULE |
|---|---|
| 0 | bird(x) $\Rightarrow$ fly(x)$^{0.9}$ |
| 1 | penguin(x) $\Rightarrow$ bird(x)$^{0.9}$ |
| 2 | penguin(x) $\Rightarrow$ swim(x)$^{0.9}$ |
| 3 | fish(x) $\Rightarrow$ swim(x)$^{0.9}$ |
| 4 | penguin(x) $\wedge$ fly(x) $\Rightarrow$ $\bot$$^{0.9}$ |

83

| RULE ID | START POINT NODE ID | END POINT NODE ID |
|---|---|---|
| 0 | 2 | 0 |
| 1 | 0 | 3 |
| 2 | 1 | 3 |
| 3 | 1 | 4 |

84

| RULE ID | NODE ID | NODE ID |
|---|---|---|
| 4 | 2 | 3 |

Fig.9

ABDUCTION APPARATUS, ABDUCTION METHOD, AND COMPUTER-READABLE RECORDING MEDIUM

This application is a National Stage Entry of PCT/JP2018/031624 filed on Aug. 27, 2018, the contents of all of which are incorporated herein by reference, in their entirety.

TECHNICAL FIELD

The present invention relates to an abduction apparatus and an abduction method for executing abduction, and further relates to a computer-readable recording medium that includes a program for realizing the same recorded thereon.

BACKGROUND ART

According to known abduction processing, first, a set of candidate hypotheses is generated using a query logical formula and background knowledge. The query logical formula is a conjunction of first-order predicate logic literals. Also, the first-order predicate logic literal is an atomic formula in a first-order predicate logic, or a negation of the atomic formula. The background knowledge is a set of inference rules. The inference rules are implication logical formulae.

Next, in such abduction processing, each candidate hypothesis of the generated set is evaluated. Then, a most appropriate candidate hypothesis (solution hypothesis) is selected, from the set of candidate hypotheses, as an explanation regarding the query logical formula based on the evaluations regarding the candidate hypotheses.

As a related technique, Non-Patent Document 1 discloses a probabilistic abduction model (Least-specific model) in which truth values are assigned only to the logical formulae included in a solution hypothesis, and the truth values of the other logical formulae are set to unknown.

Also, as a related technique, Non-Patent Document 2 discloses a model (Most-specific model) in which truth values are assigned to all of the query logical formulae from background knowledge based on the Herbrand's theorem. For example, a truth value "True" or "False" is assigned to all of the query logical formulae.

LIST OF RELATED ART DOCUMENTS

Non-Patent Document

Non-Patent Document 1: Naoya Inoue and Andrew S. Gordon, "A Scalable Weighted Max-SAT Implementation of Propositional Etcetera Abduction", Proceedings of the 30th International Florida Artificial Intelligence Research Society Conference (FLAIRS), pp. 62-67, May 2017.

Non-Patent Document 2: Rohit J. Kate and Raymond J. Mooney, "Probabilistic Abduction Using Markov Logic Networks", Proceedings of IJCAI-09 Workshop on Plan, Activity, and Intent Recognition, 2009.

SUMMARY

Technical Problems

However, in the model (least-specific model) disclosed in Non-Patent Document 1 as described above, although the efficiency of the abduction processing is high, the truth values can be arbitrarily set to unknown, and therefore there are cases where an expected inference result cannot be obtained. That is, the truth values of the query logical formulae that are not included in the solution hypothesis are set to "unknown" in order to maximize the evaluation function value, and therefore an inappropriate inference result is obtained.

Also, in the model (most-specific model) disclosed in Non-Patent Document 2, although some truth values can be obtained regarding all of the query logical formulae, the Herbrand universe needs to be constructed, and therefore there are cases where the efficiency of abduction processing decreases.

An example object of the present invention is to provide an abduction apparatus and an abduction method that can assign truth values to query logical formulae without degrading the efficiency of abduction processing, and a computer readable recording medium.

Solution to the Problems

To achieve the above-stated example object, an abduction apparatus according to an example aspect of the present invention includes:
 a probability calculation unit configured to calculate, with respect to each of candidate hypotheses generated using observation information and knowledge information, a probability that the candidate hypothesis is an explanation regarding the observation information;
 a closed world assumption probability calculation unit configured to calculate, with respect to the candidate hypotheses, a closed world assumption probability that the candidate hypothesis is an explanation regarding a first-order predicate logic literal to which a new truth value is determined as a result of assuming a closed world assumption; and
 a solution hypothesis determination unit configured to determine a solution hypothesis that is an explanation regarding the observation information from the candidate hypotheses using the probability and the closed world assumption probability.

Also, to achieve the above-stated example object, an abduction method according to an example aspect of the present invention includes:
 calculating, with respect to each of candidate hypotheses generated using observation information and knowledge information, a probability that the candidate hypothesis is an explanation regarding the observation information;
 calculating, with respect to the candidate hypotheses, a closed world assumption probability that the candidate hypothesis is an explanation regarding a first-order predicate logic literal to which a new truth value is determined as a result of assuming a closed world assumption; and
 determining a solution hypothesis that is an explanation regarding the observation information from the candidate hypotheses using the probability and the closed world assumption probability.

Furthermore, to achieve the above-stated example object, a computer-readable recording medium according to an example aspect of the present invention is a computer-readable recording medium that includes a program recorded thereon, the program causing the computer to carry out:
 calculating, with respect to each of candidate hypotheses generated using observation information and knowledge information, a probability that the candidate hypothesis is an explanation regarding the observation information;

calculating, with respect to the candidate hypotheses, a closed world assumption probability that the candidate hypothesis is an explanation regarding a first-order predicate logic literal to which a new truth value is determined as a result of assuming a closed world assumption; and determining a solution hypothesis that is an explanation regarding the observation information from the candidate hypotheses using the probability and the closed world assumption probability.

Advantageous Effects of the Invention

As described above, according to the present invention, truth values can be assigned to query logical formulae without degrading the efficiency of abduction processing.

EXAMPLE EMBODIMENT

Example Embodiment

Hereinafter, an example embodiment of the present invention will be described with reference to FIGS. 1 to 9.

[Apparatus Configuration]

Figure 1:
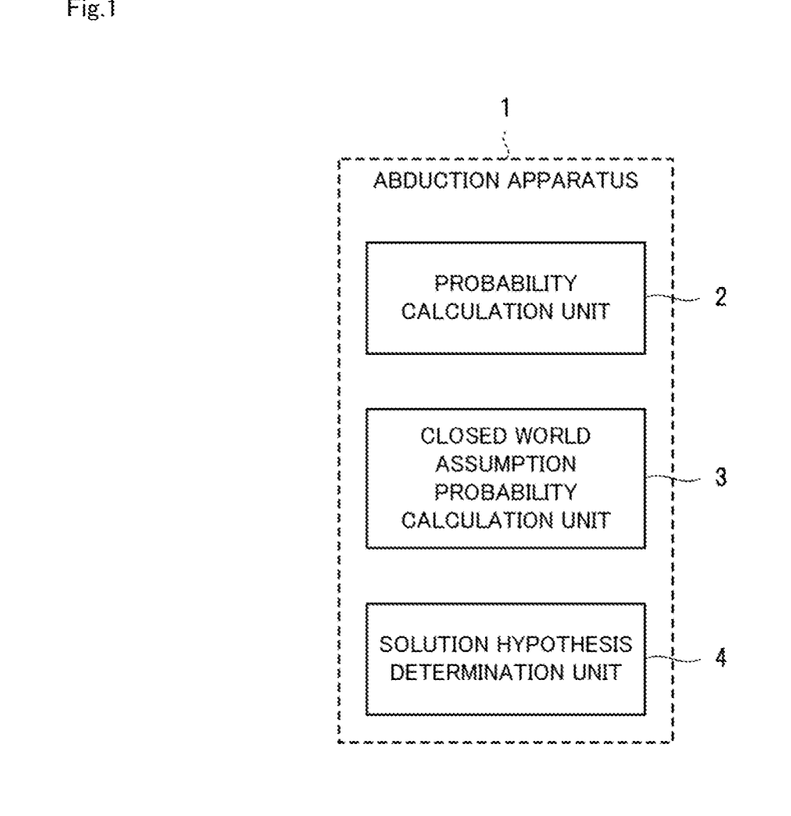
FIG. 1 is a diagram illustrating an example of an abduction apparatus.

First, the configuration of an abduction apparatus 1 according to the present example embodiment will be described using FIG. 1. FIG. 1 is a diagram illustrating an example of the abduction apparatus 1.

The abduction apparatus 1 shown in FIG. 1 is an apparatus that can assign truth values to query logical formulae without degrading the processing efficiency. As shown in FIG. 1, the abduction apparatus 1 includes a probability calculation unit 2, a closed world assumption probability calculation unit 3, and a solution hypothesis determination unit 4.

Among these units, the probability calculation unit 2 calculates, with respect to each candidate hypothesis generated using observation information (query logical formula) and knowledge information (background knowledge), the probability that the candidate hypothesis is an explanation regarding the observation information. The closed world assumption probability calculation unit 3 calculates, with respect to a candidate hypothesis, a closed world assumption probability that the candidate hypothesis is an explanation regarding the observation information in which a new truth value is determined as a result of assuming the closed world assumption. The solution hypothesis determination unit 4 determines a solution hypothesis that is a best explanation regarding the observation information from the candidate hypotheses using the probabilities and the closed world assumption probabilities.

As described above, in the present example embodiment, the solution hypothesis that is a best explanation regarding observation information can be determined from the candidate hypotheses using probabilities and closed world assumption probabilities, and therefore truth values can be assigned to query logical formulae without degrading the efficiency of abduction processing.

[System Configuration]

Figure 2:
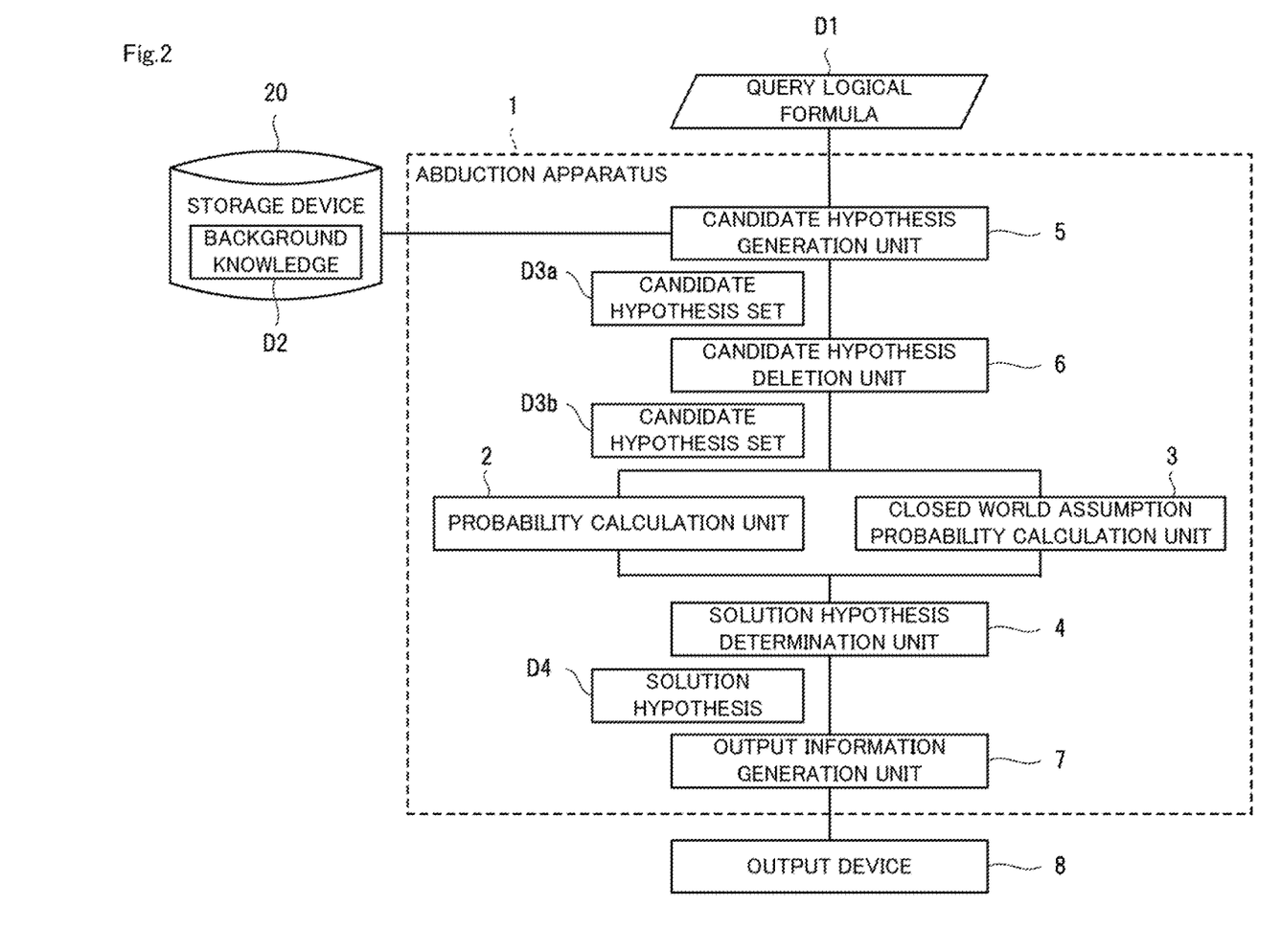
FIG. 2 is a diagram illustrating an example of a system including the abduction apparatus.

Next, the configuration of the abduction apparatus 1 according to the present example embodiment will be more specifically described using FIG. 2. FIG. 2 is a diagram illustrating an example of a system including the abduction apparatus.

As shown in FIG. 2, the abduction apparatus 1 in the present example embodiment includes a candidate hypothesis generation unit 5, a candidate hypothesis deletion unit 6, and an output information generation unit 7 in addition to the probability calculation unit 2, the closed world assumption probability calculation unit 3, and the solution hypothesis determination unit 4. Also, the system including the abduction apparatus 1 includes an output device 8 and a storage device 20. The storage device 20 may be provided inside of the abduction apparatus 1, or may be provided outside thereof.

Figure 3:
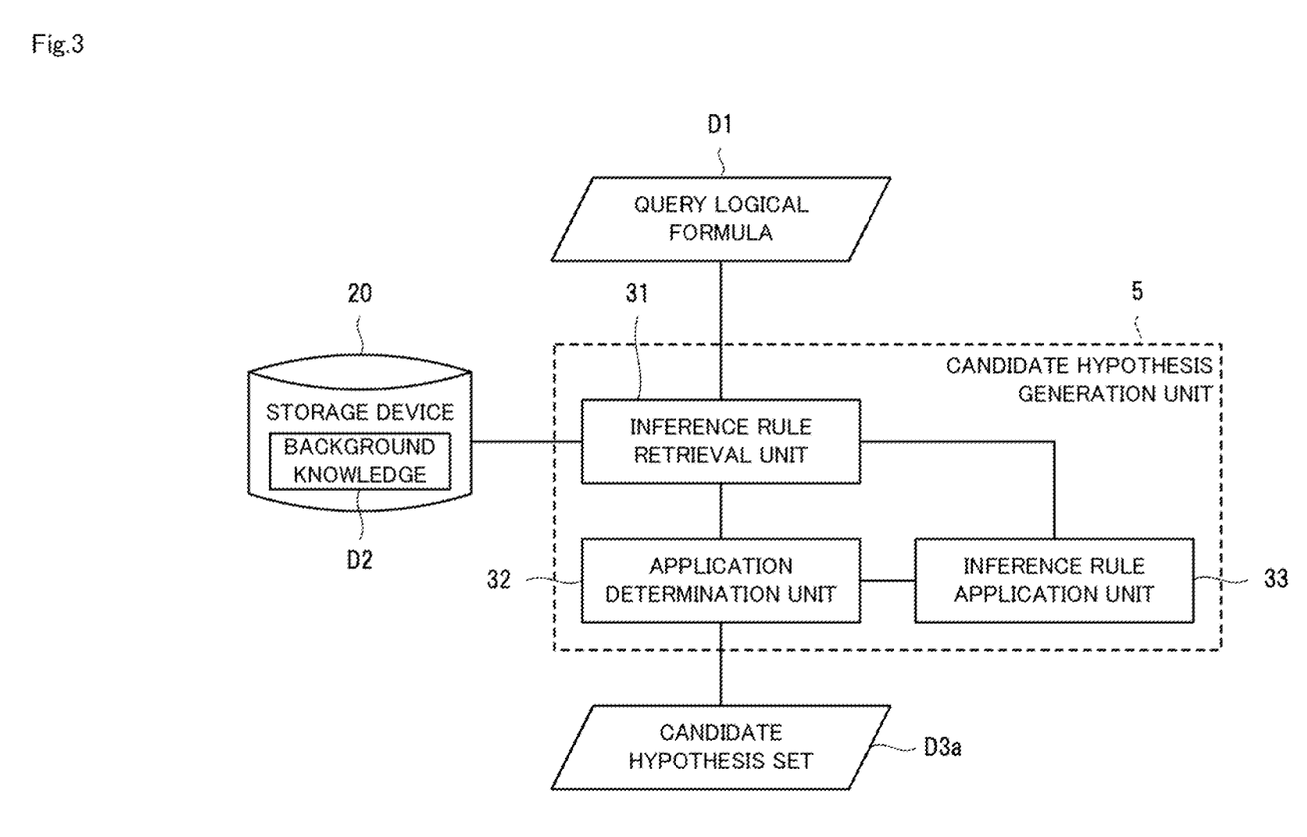
FIG. 3 is a diagram illustrating an example of a candidate hypothesis generation unit.

The candidate hypothesis generation unit 5 acquires a query logical formula D1 and background knowledge D2 that is stored in the storage device 20, and generates a candidate hypothesis set D3a including a plurality of candidate hypotheses using processing for generating candidate hypotheses. Also, the candidate hypothesis generation unit 5 includes an inference rule retrieval unit 31, an application determination unit 32, and an inference rule application unit 33, as shown in FIG. 3. FIG. 3 is a diagram illustrating an example of the candidate hypothesis generation unit.

The query logical formula D1 is a conjunction of first-order predicate logic literals. The first-order predicate logic literal is an atomic formula or a negation thereof in the first-order predicate logic.

The background knowledge D2 is a set of inference rules. The inference rule is an implication logical formula, and is expressed by a logical formula in a form shown in formula (1).

[Math. 1]

$$P_1 \wedge P_2 \wedge \ldots \wedge P_N \Rightarrow Q_1 \wedge Q_2 \wedge \ldots \wedge Q_M \qquad (1)$$

$P_i$, $Q_j$: first-order predicate logic literal

Note that it is assumed that the variables included in the antecedents in the inference rules are all universally quantified, and the variables included in only the consequents of the inference rules are all existentially quantified. Hereinafter, even in a case where the quantifier is omitted, each variable is quantified based on the assumption described above.

Also, it is assumed that a case where the antecedent is empty, that is, N=0 in formula (1) is allowed, and such a rule is called a fact, which indicates that the consequent unconditionally holds true. In the following, the antecedent and implication symbol will be omitted regarding a fact, and the fact is simply expressed by a logical formula in a form of formula (2).

[Math. 2]

$$Q_1 \wedge Q_2 \wedge \ldots \wedge Q_M \quad (2)$$

Also, an inference rule in which a consequent is false is allowed. Moreover, each inference rule is given parameters needed in the probability calculation to be performed in the probability calculation unit 2, and the closed world assumption probability calculation unit 3. What types of parameters are given are determined based on the models that are adopted in the probability calculation unit 2 and the closed world assumption probability calculation unit 3. Specifically, an inference rule is given a probability (refer to formula (3)) that the inference rule holds true backwardly, and a probability (refer to formula (4)) that the inference rule holds true forwardly, for example.

[Math. 3]

$$p(\wedge_{i=1}^{M} P_i | \wedge_{j=1}^{M} Q_j) \quad (3)$$

[Math. 4]

$$p(\wedge_{i=1}^{M} Q_i | \wedge_{j=1}^{N} P_j) \quad (4)$$

Note that, a fact and an inference rule in which the consequent is false will not be used in backward inference, and therefore the probability of holding true backwardly is not needed in the fact and the inference rule.

The candidate hypothesis set D3*a* is a set of candidate hypotheses that is output from the candidate hypothesis generation unit 5. The candidate hypothesis is a directed non-cycling hypergraph in which first-order predicate logic literals are nodes, and an edge that connects hypemodes expresses a relationship "which literal is explained by which literal using which inference rule". The terminal node that is reached by tracing back edges matches one of the first-order predicate logic literals included in the query logical formula D1. Also, the first-order predicate logic literal corresponding to an unexplained node, that is, a node that is not included in any end points of edges is called an element hypothesis logical formula.

The inference rule retrieval unit 31 performs processing in which an inference rule is retrieved that can be applied backwardly with respect to the current candidate hypothesis set D3*a*. Specifically, the inference rule retrieval unit 31 retrieves an inference rule in which a manner of variable substitution is present so as to be equivalent with the conjunction of the first-order predicate logic literals included in the candidate hypothesis, with respect to the first-order predicate logic literals included in the consequent of the inference rule. For example, with respect to a candidate hypothesis q(A), an inference rule p(x)q(x) is backwardly applicable, and an inference rule p(x)r(x) is not backwardly applicable.

The application determination unit 32 performs end determination of processing for generating a candidate hypothesis. Specifically, if an inference rule that can be newly applied to the current candidate hypothesis set D3*a* is not present, the application determination unit 32 ends the processing of the candidate hypothesis generation unit 5, and outputs the candidate hypotheses that have been generated until this point in time.

The inference rule application unit 33 performs processing for generating a new candidate hypothesis by applying the inference rule retrieved by the inference rule retrieval unit 31 to the candidate hypothesis set D3*a*. Specifically, the inference rule application unit 33 generates a new candidate hypothesis q(A)∧p (A) by applying the inference rule p(x)⇒q(x) to the candidate hypothesis q(A).

Note that the candidate hypothesis generation unit 5 may generate the candidate hypothesis set D3*a* using the processing shown in FIG. 3, or may also generate the candidate hypothesis set D3*a* using another method.

The candidate hypothesis deletion unit 6 deletes a candidate hypothesis that is redundant as a best hypothesis from the candidate hypothesis set D3*a*. Specifically, the candidate hypothesis deletion unit 6 generates a candidate hypothesis set D3*b* by deleting a candidate hypothesis including a first-order predicate logic literal having a dependency relationship (probabilistic dependency relationship) with only one query logical formula D1 from the candidate hypothesis set D3*a*.

Also, the candidate hypothesis deletion unit 6 also determines some value to the truth value of a first-order predicate logic literal based on heuristics. That is, a proposition is removed that is related to the abduction but needs not be deliberately considered. For example, an abduction that does not contribute to the explanation of the query logical formula D1, an abduction in which a fact explains a different fact, and an abduction that explains the query logical formula D1, but does not have a probabilistic dependency relationship with the query logical formula D1 or a fact may be removed.

Specifically, the candidate hypothesis deletion unit 6 sets the truth value to "True" regarding a first-order predicate logic literal that is derived by forward inference from the query logical formula D1. In contrast, the candidate hypothesis deletion unit 6 sets the truth value to "False" regarding a first-order predicate logic literal that is derived by backward inference from the query logical formula D1.

In this way, as a result of obtaining a best truth-value assignment regarding the candidate hypothesis set D3*b*, it is not allowed that the truth value is set to "unknown" regarding the query logical formula D1. In other words, the abduction processing is executed in a narrower space (candidate hypothesis set D3*b*) than the Herbrand universe, and therefore the efficiency of abduction processing cannot be degraded relative to the case where the abduction processing is performed in the Herbrand universe.

The probability calculation unit 2 acquires candidate hypotheses from the candidate hypothesis set D3*b*, and outputs, with respect to each candidate hypothesis, an actual value indicating the probability of the candidate hypothesis based on a probabilistic abduction model. Specifically, the probability calculation unit 2 calculates, with respect to each candidate hypothesis generated using the query logical formula D1 and the background knowledge D2, the probability that the candidate hypothesis is an explanation regarding the query logical formula D1.

For example, when a probabilistic abduction model is adopted, the probability calculation unit 2 calculates, with respect to inference rules that include both of the antecedent and the consequent in the candidate hypothesis, the joint probability that all of the inference rules hold true. A Least-specific model or the like is conceivable as the probabilistic abduction model. Note that the probability calculation unit 2 may adopt any definition regarding the probability.

The closed world assumption probability calculation unit 3 acquires candidate hypotheses from the candidate hypothesis set D3*b*, and with respect to each candidate hypothesis, evaluates the probability regarding a first-order predicate logic literal to which a truth value is newly determined as a result of assuming the closed world assumption and that is not considered in the probability calculation unit 2, and outputs an actual value representing the probability. Specifically, the closed world assumption probability calculation unit 3 calculates a closed world assumption probability of being an explanation regarding a first-order predicate logic literal to which a new truth value is determined as a result of assuming the closed world assumption.

For example, when a probabilistic abduction model is adopted, the closed world assumption probability calculation unit 3 determines the truth value of a first-order predicate logic literal that is included in the candidate hypothesis set D3*b*, but is not included in the target candidate hypothesis as being false. Also, the closed world assumption probability calculation unit 3 enumerates inference rules regarding which true or false is newly determined, and calculates the joint probability that the inference rules respectively take the determined truth values.

The solution hypothesis determination unit 4 outputs, from candidate hypotheses regarding which the probability and the closed world assumption probability are calculated, the candidate hypothesis regarding which the probability that the candidate hypothesis is an explanation of the query logical formula D1 is largest under the closed world assumption. Specifically, the solution hypothesis determination unit 4 determines a solution hypothesis D4 that is a best explanation regarding the query logical formula D1 from the candidate hypotheses using the probabilities and the closed world assumption probabilities.

For example, the solution hypothesis determination unit 4 selects a candidate hypothesis regarding which the evaluation value obtained by multiplying the probability and the closed world assumption probability is largest. Note that the solution hypothesis may be obtained by the problem being formulated as some combinatorial optimization problem such as an integer linear planning problem or a weighted satisfiability problem, and a corresponding solver retrieving the optimum solution.

The output information generation unit 7 generates output information for outputting a first-order predicate logic literal to which the new truth value is determined as false "False" as a result of assuming the closed world assumption or the closed world assumption probability, or both of the items to the output device 8. Alternatively, the output information generation unit 7 generates graph structure information for outputting a graph structure to the output device 8 using the query logical formula D1, the first-order predicate logic literal, the candidate hypothesis, the probability, the closed world assumption probability, and the solution hypothesis D4. Moreover, the output information generation unit 7 may generate both of the output information and the graph structure information. Thereafter, the output information generation unit 7 transmits the generated output information or the graph structure information, or both pieces of the information to the output device 8.

The output device 8 receives the output information that is converted to an outputtable format or the graph structure information, or both pieces of the information from the output information generation unit 7, and outputs an image, a sound, and the like that are generated based on the output information or the graph structure information, or both pieces of the information. The output device 8 includes an image display device using liquid crystal, organic EL (Electro Luminescence), or a CRT (Cathode Ray Tube), and furthermore, a sound output device such as a speaker, for example. Note that the output device 8 may also be a printing device such as a printer.

[Apparatus Operations]

Figure 4:
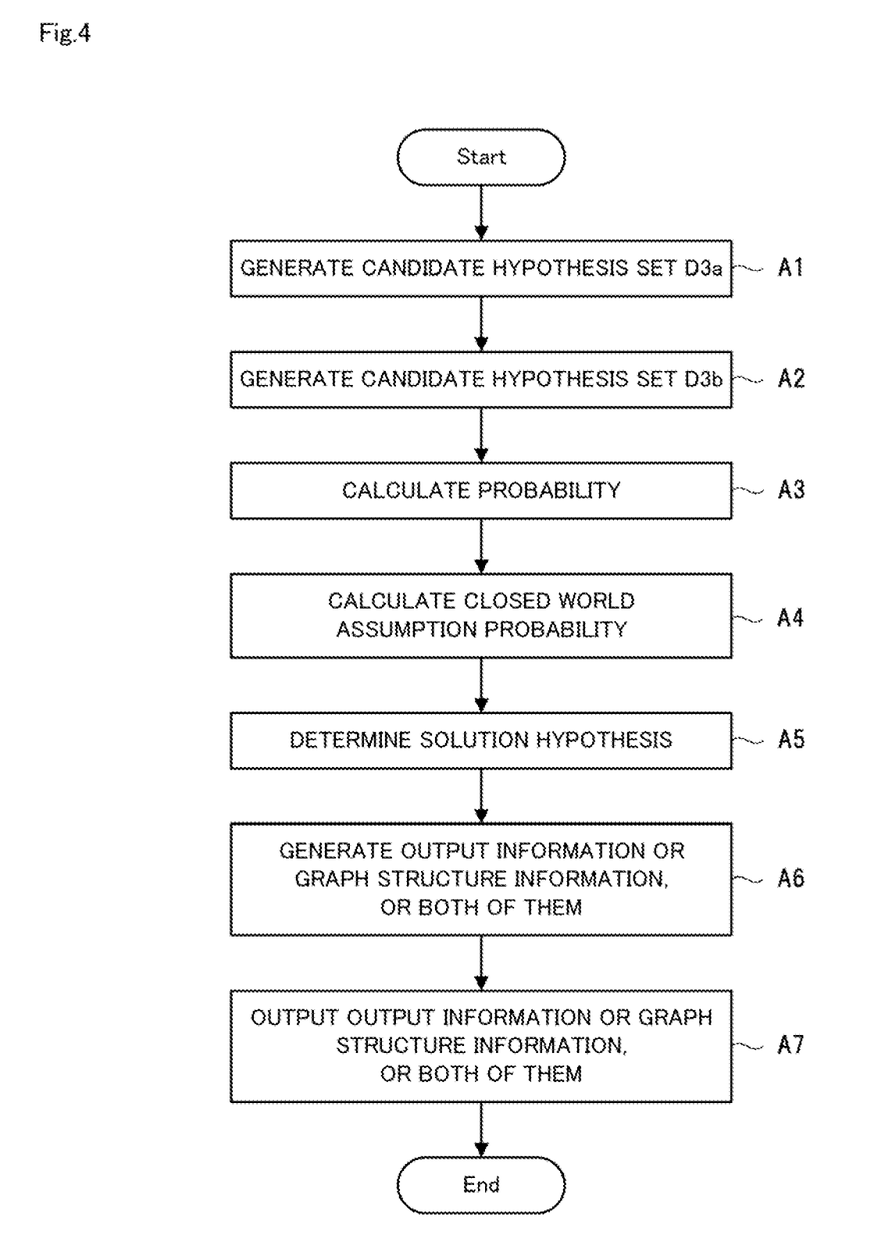
FIG. 4 is a diagram illustrating an example of operations of the abduction apparatus.
Figure 5:
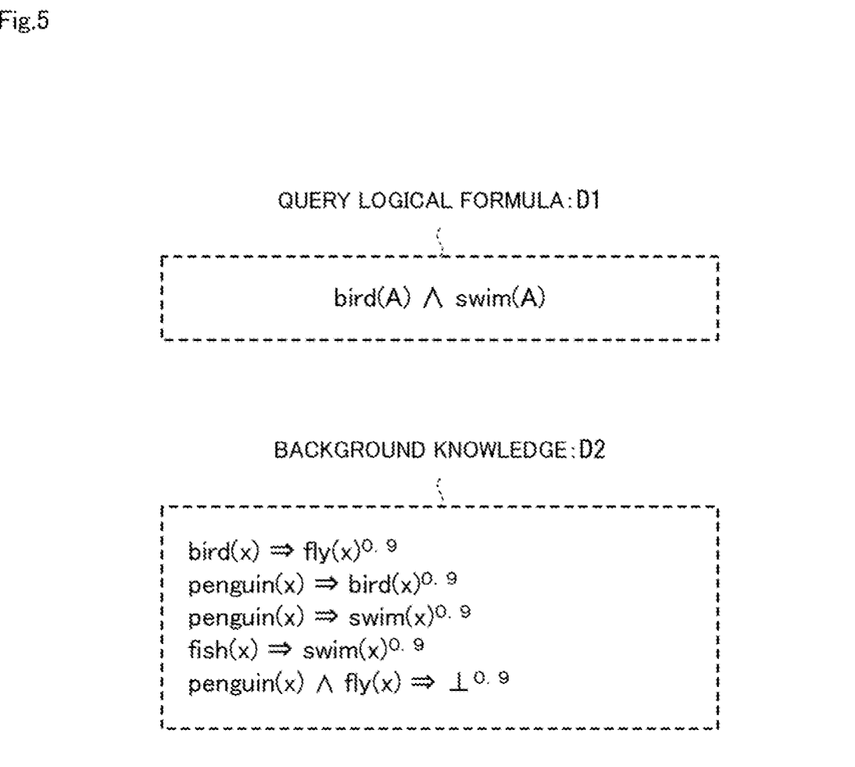
FIG. 5 is a diagram illustrating an example of a query logical formula and background knowledge.
Figure 6:
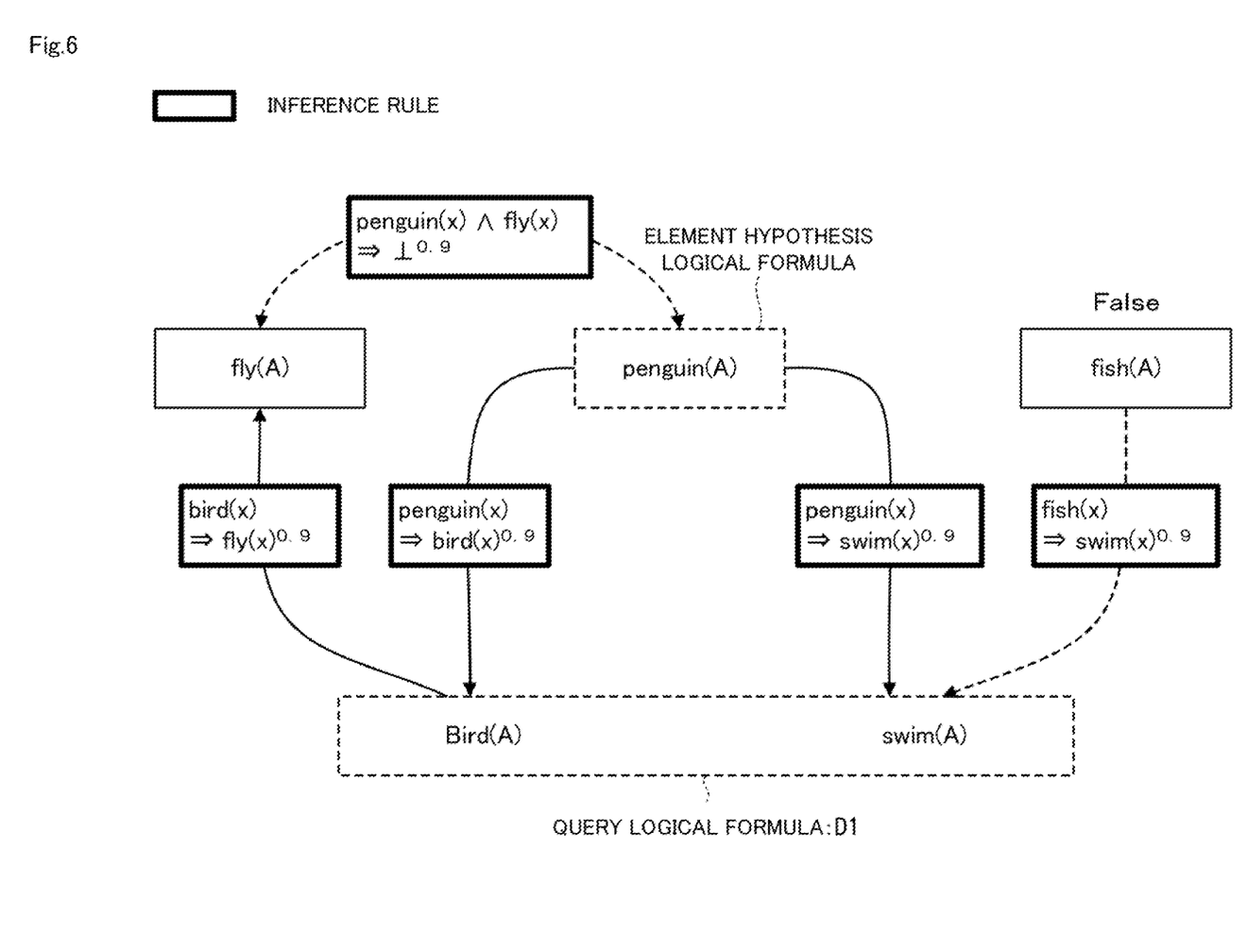
FIG. 6 is a diagram illustrating an example of a candidate hypothesis.
Figure 7:
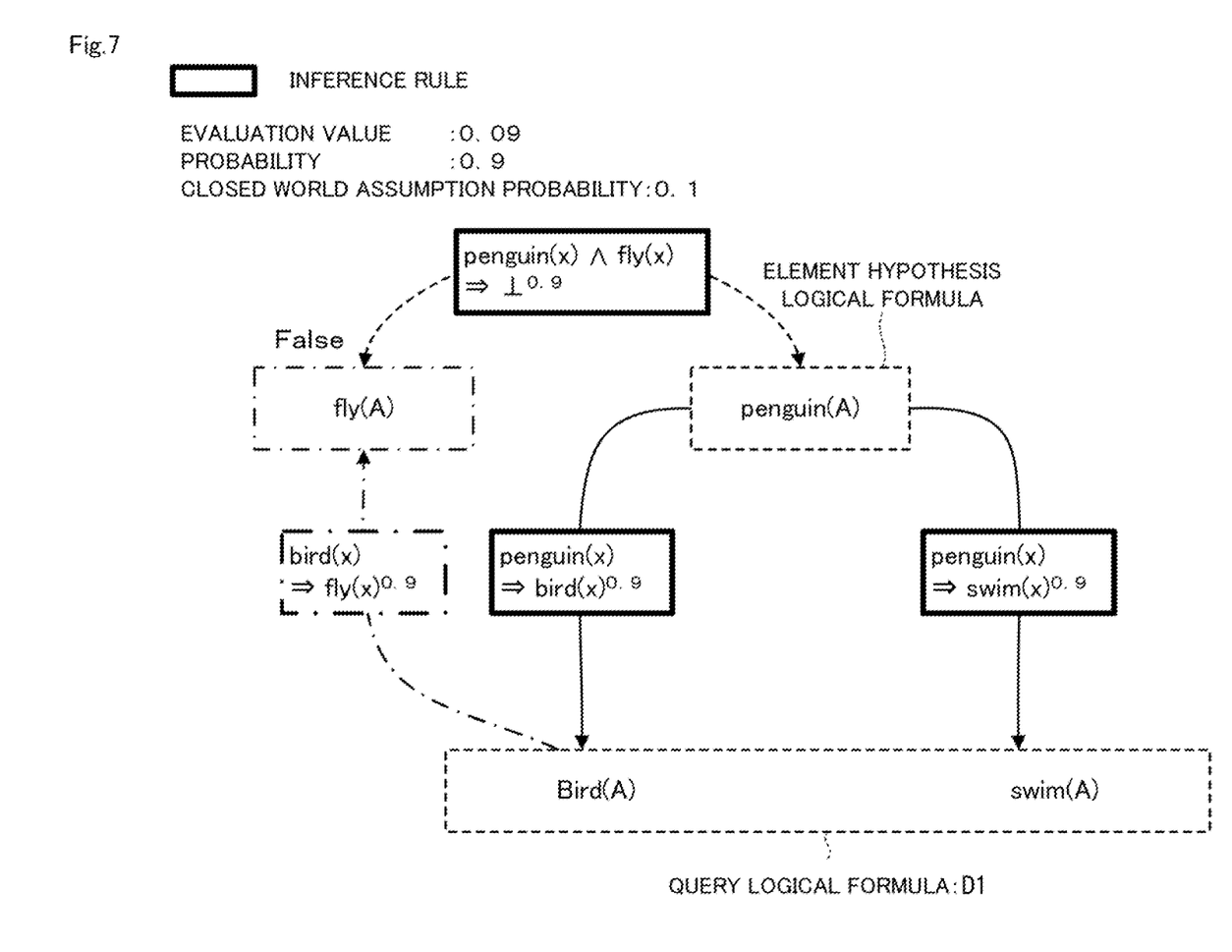
FIG. 7 is a diagram illustrating an example of a candidate hypothesis in which a redundant candidate hypothesis is deleted.
Figure 8:
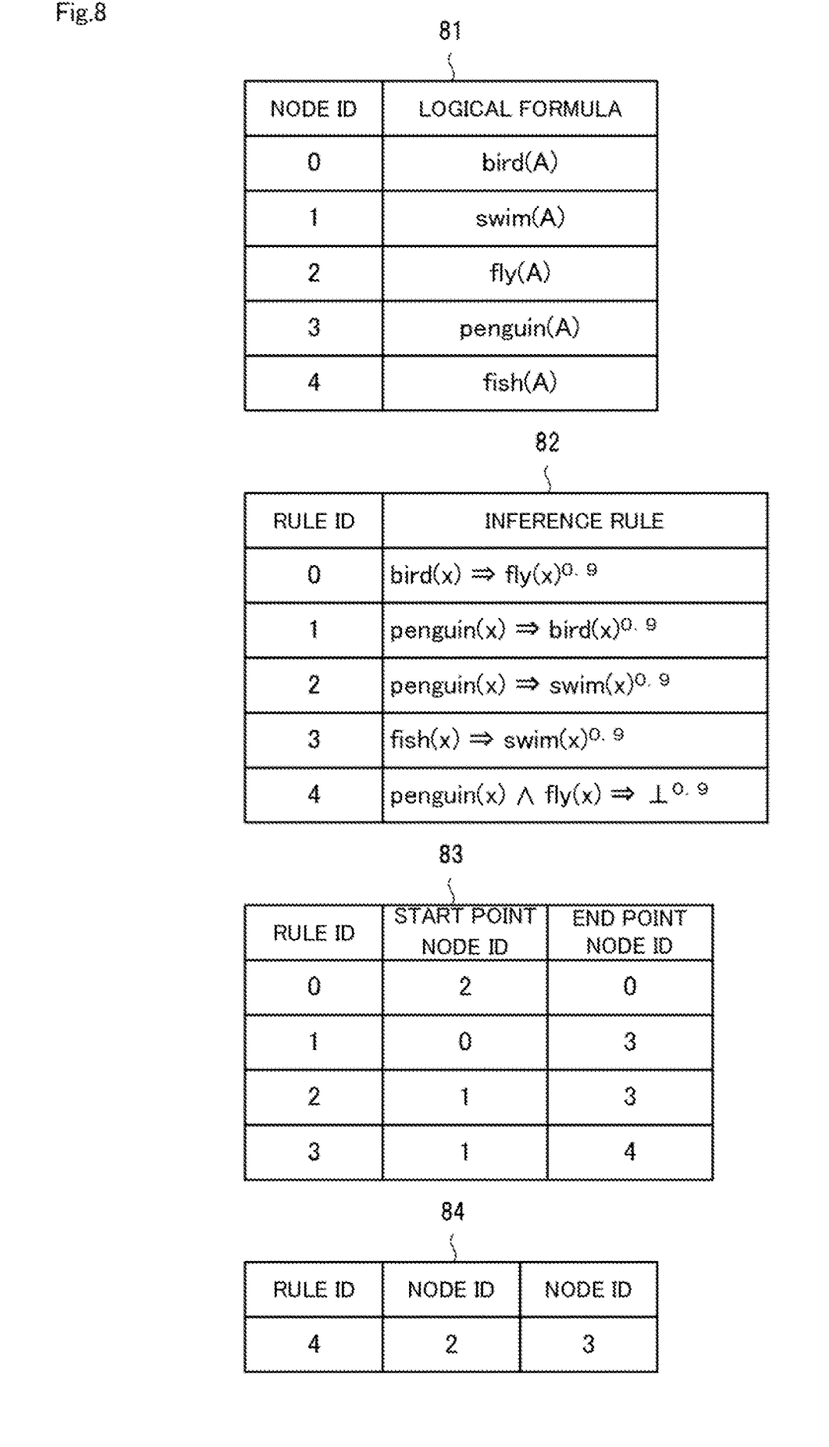
FIG. 8 is a diagram illustrating an example of a data structure of the candidate hypothesis.

Next, the operations of the abduction apparatus 1 according to the example embodiment of the present invention will be described using FIGS. 4, 5, 6, 7 and 8. FIG. 4 is a diagram illustrating an example of the operations of the abduction apparatus. FIG. 5 is a diagram illustrating an example of the query logical formula and the background knowledge. FIG. 6 is a diagram illustrating an example of the candidate hypothesis. FIG. 7 is a diagram illustrating an example of the candidate hypothesis in which a redundant candidate hypothesis is deleted. FIG. 8 is a diagram illustrating an example of the data structure of the candidate hypothesis. In the following description, FIGS. 2 to 8 will be referred to as appropriate. Furthermore, in the present example embodiment, the abduction method is carried out by causing the abduction apparatus 1 to operate. Therefore, the following description of the operations of the abduction apparatus 1 applies to the abduction method according to the present example embodiment.

As shown in FIG. 4, first, the candidate hypothesis generation unit 5 acquires the query logical formula D1 and the background knowledge D2, and generates a candidate hypothesis set D3*a* that includes a plurality of candidate hypotheses (step A1). Next, the candidate hypothesis deletion unit 6 generates a candidate hypothesis set D3*b* by deleting a candidate hypothesis including a first-order predicate logic literal having a dependency relationship (probabilistic dependency relationship) with only one query logical formula D1 from the candidate hypothesis set D3*a* (step A2).

Next, the probability calculation unit 2 calculates, with respect to each of the candidate hypothesis sets D3*b* generated using the query logical formula D1 and the background knowledge D2, the probability that the candidate hypothesis is an explanation regarding the query logical formula D1 (step A3). The closed world assumption probability calculation unit 3 calculates the closed world assumption probability of being an explanation regarding a query logical formula D1 to which a new truth value is determined as a result of assuming the closed world assumption (step A4). Note that the order of processing in steps A3 and A4 is not specifically limited. Also, the processing in steps A3 and A4 may be executed at the same time.

Next, the solution hypothesis determination unit 4 determines a solution hypothesis D4 that is to be a best explanation regarding the query logical formula D1 from the candidate hypotheses using the probabilities and the closed world assumption probabilities (step A5).

Next, the output information generation unit 7 generates output information for outputting the query logical formula D1 to which the new truth value is determined as false as a result of assuming the closed world assumption or the closed world assumption probability, or both of the items to the output device 8 (step A6). Alternatively, the output information generation unit 7 generates graph structure information for outputting a graph structure to the output device 8 using the query logical formula D1, the candidate hypothesis, the probability, the closed world assumption probability, and the solution hypothesis D4. Moreover, the output information generation unit 7 may generate both of the output information and the graph structure information.

The output device 8 receives the output information that is converted to an outputtable format or the proof tree information, or both pieces of the information from the output information generation unit 7, and outputs an image, a sound, and the like that are generated based on the output information or the graph structure information, or both pieces of the information (step A7).

Next, the operations of the abduction apparatus 1 will be described more specifically.

A query logical formula D1 "bird(A)∧swim(A)" is a conjunction in which a target state "a bird is swimming" is logically expressed. Refer to query logical formula D1 shown in FIG. 5.

The background knowledge D2 gives, a logical formula that expresses observation information that "a bird is swimming" being the query logical formula D1, inference rules that expresses, in logical expressions, knowledges "if x is a bird, then x flies", "if x is a penguin, then x is a bird", "if x is a penguin, then x swims", "if x is a fish, then x swims", and "x is a penguin and x never flies". Refer to the background knowledge D2 shown in FIG. 5.

Also, the actual values given to the consequent of each inference rule of the background knowledge D2 indicates the probability that the inference rule holds true forwardly. For example, in the case of the third row in the background knowledge D2 in FIG. 5, it is shown that if penguin(x) holds true, swim(x) hold true with a probability 0.9.

In step A1, first, the candidate hypothesis generation unit 5 generates a candidate hypothesis set D3a from the query logical formula D1 and the background knowledge D2. Note that the initial state of the candidate hypothesis set D3a includes only a candidate hypothesis including only the query logical formula D1.

Specifically, in step A1, first, the inference rule retrieval unit 31 of the candidate hypothesis generation unit 5 retrieves an inference rule that can be applied to the candidate hypothesis set D3a from the background knowledge D2. For example, with respect to an inference rule "penguin (x)⇒swim (x)", as a result of performing substitution "x=A", the consequent of the inference rule matches a portion of the candidate hypothesis, and therefore this inference rule is selected as being applicable backwardly. Also, with respect to an inference rule "bird (x)⇒fly (x)" as well, as a result of performing substitution "x=A", the consequent of the inference rule matches a portion of the candidate hypothesis, and therefore this inference rule is selected as being applicable forwardly.

Next, in step A1, the inference rules selected by the inference rule retrieval unit 31 are applied to the candidate hypothesis set D3a in the inference rule application unit 33. For example, if a backward inference using the inference rule "penguin(x)swim(x)" is applied to the initial state of the candidate hypothesis set D3a described above, "bird(A)∧swim(A)∧penguin(A)" is added to the candidate hypothesis set D3a as a new candidate hypothesis.

Next, in step A2, the candidate hypothesis deletion unit 6 acquires the candidate hypothesis set D3a output from the candidate hypothesis generation unit 5 as an input, and deletes a redundant candidate hypothesis, that is a candidate hypothesis including a first-order predicate logic literal having only a dependency relationship (probabilistic dependency relationship) with a single query logical formula D1.

For example, in the candidate hypothesis shown in FIG. 6, "fish(A)" has a dependency relationship with only "swim (A)" in the query logical formula D1, and therefore this candidate hypothesis is removed from the candidate hypothesis set D3a. Also, "fish(A)" is derived from "swim(A)" by a backward inference, and therefore the truth value of "fish(A)" is treated as "False" in the following processing.

Next, in step A3, the probability calculation unit 2 acquires the candidate hypothesis set D3b as an input, and evaluates, with respect to each candidate hypothesis, the probability of being an explanation regarding the query logical formula D1. Any definition may be adopted regarding the probability here, and here, the probability that a truth-value assignment represented by the candidate hypothesis holds true, that is, the joint probability that all of the inference rules that hold true in the truth-value assignment hold true is calculated, as an example.

For example, in the candidate hypothesis shown in FIG. 7, the inference rules that are being used correspond to solid line arrows. Therefore, as a result of calculating the joint probability that these two inference rules hold true forwardly, the probability (=1.0×0.9=0.9) indicating the probability that this candidate hypothesis is an explanation of the query logical formula D1 is calculated.

Next, in step A4, the closed world assumption probability calculation unit 3 acquires the candidate hypothesis set D3b output from the candidate hypothesis generation unit 5 as an input, and evaluates, with respect to each candidate hypothesis, the probability regarding the first-order predicate logic literal to which a truth value is newly determined as a result of assuming the closed world assumption. Here, the probability that the truth-value assignment represented by the candidate hypothesis holds true, that is, the joint probability that all of the inference rules that hold true in the truth-value assignment hold true is calculated, as an example.

For example, in the candidate hypothesis shown in FIG. 6, the forward inference for deriving "fly(A)" has not been executed, and therefore the truth value of "fly(A)" in this candidate hypothesis is false ("False") under the closed world assumption. As a result of "fly(A)" being determined as "False", it can be understood to be contradicting to the inference rule "bird(x)⇒fly(x)", and as its probability, the closed world assumption probability 0.1 that this inference rule contradicts is output as the evaluation value.

More specifically, it is necessary that the above inference rule does not hold true in order for this candidate hypothesis to hold true, and therefore the value 0.1 obtained by subtracting the establishment probability 0.9 of the inference rule from 1.0 is calculated as the closed world assumption probability.

Next, in step A5, the solution hypothesis determination unit 4 selects the best candidate hypothesis considering the evaluation value obtained by the probability calculation unit 2 and the closed world assumption probability calculation unit 3. For example, the solution hypothesis determination unit 4 selects, in the example in FIG. 7, a candidate hypothesis regarding which the evaluation value (=0.9× 0.1=0.09) obtained by multiplying the probability and the closed world assumption probability is largest. If a plurality of candidate hypotheses regarding which the evaluation value is largest are present, any one of them is selected. As a selection method, a method of selecting a candidate hypothesis regarding which the number of included nodes is smallest, a method of selecting a candidate hypothesis whose address on a computer memory is smallest, or the like is conceivable. Note that the selection method is not limited to the methods described above.

Next, in step A6, the output information generation unit 7 generates output information for outputting a first-order predicate logic literal regarding which the new truth value is determined as false as a result of assuming the closed world assumption or the closed world assumption probability, or both of the items to the output device 8. Alternatively, the output information generation unit 7 generates graph structure information for outputting a graph structure to the output device 8 using the query logical formula D1, the first-order predicate logic literal, the candidate hypothesis, the probability, the closed world assumption probability, and the solution hypothesis D4.

Moreover, the output information generation unit 7 may generate both of the output information and the graph structure information. For example, it is conceivable to display the output information and the graph structure information as shown in FIG. 7.

Note that the output information generation unit 6 generates information for a display as shown in FIGS. 6 and 7 using pieces of information 81 to 84 shown in FIG. 8, for example. The information 81 shown in FIG. 8 is information in which "node IDs" for identifying logical formulae included in the candidate hypothesis shown in FIGS. 6 and 7 are associated with logical formulae. The information 82 is information in which "rule IDs" for identifying inference rules included in the candidate hypothesis that are used in FIGS. 6 and 7 are associated with inference rules.

The information 83 is information in which edges (solid line arrows shown in FIG. 6), shown in FIG. 6, that are included in the candidate hypothesis are associated with "start node IDs" indicating the start points, "end point node IDs" indicating the end points, and "rule IDs". The information 84 is information in which a contradiction edge (broken line arrow shown in FIG. 6) included in the candidate hypothesis, shown in FIG. 6, is associated with a "node ID" that is a cause of the contradiction and a "rule ID" indicating the contradicting rule.

Note that when the diagram shown in FIG. 7 is displayed, the inference rule corresponding to the final row in the information 83 is not applied, and therefore the display may be performed as shown in FIG. 7 (one dot chain line). Also, the display (broken line in FIG. 7) related to the information 84 need not be displayed in FIG. 7 as well.

Next, in step A7, the output device 8 receives output information that is converted to an outputtable format or graph structure information, or both pieces of the information from the output information generation unit 7, and outputs an image, a sound, and the like that are generated based on the output information or the graph structure information, or both pieces of the information.

[Effects According to Present Example Embodiment]

As described above, according to the present example embodiment, a solution hypothesis that is a best explanation regarding the observation information can be determined from candidate hypotheses using the probability and the closed world assumption probability, and therefore a truth value can be assigned to a query logical formula without degrading the processing efficiency.

Also, in the present example embodiment, efficient abduction due to being able to perform control on a search space can be realized while the probability regarding a query logical formula that is not included in the solution hypothesis is considered in the evaluation, which cannot be realized by the conventional method.

Also, the target to which the truth value is determined is limited to those that can contribute to the explanation of a query logical formula, and therefore the search space regarding the solution hypothesis can be reduced relative to the conventional method, and as a result, the abduction processing can be efficiently executed compared with an abduction model based on the Most-specific model, for example.

The truth values can be suppressed from being arbitrarily set to unknown by assuming the closed world assumption with respect to a logical formula set that is the target of the abduction, and determining all of the truth values, and as a result, the evaluation of the probability of a candidate hypothesis can be performed more accurately than an abduction method based on the Least-specific model.

[Program]

A program according to the present example embodiment need only be a program for causing a computer to perform steps A1 to A7 shown in FIG. 4. The abduction apparatus and the abduction method according to the present example embodiment can be realized by installing this program on a computer and executing the program. In this case, a processor of the computer functions as the probability calculation unit 2, the closed world assumption probability calculation unit 3, the solution hypothesis determination unit 4, the candidate hypothesis generation unit 5, the candidate hypothesis deletion unit 6, and the output information generation unit 7, and performs processing.

Also, the program according to the present example embodiment may also be executed by a computer system that includes a plurality of computers. In this case, for example, each of the computers may function as any of the probability calculation unit 2, the closed world assumption probability calculation unit 3, the solution hypothesis determination unit 4, the candidate hypothesis generation unit 5, the candidate hypothesis deletion unit 6, and the output information generation unit 7.

[Physical Configuration]

Figure 9:
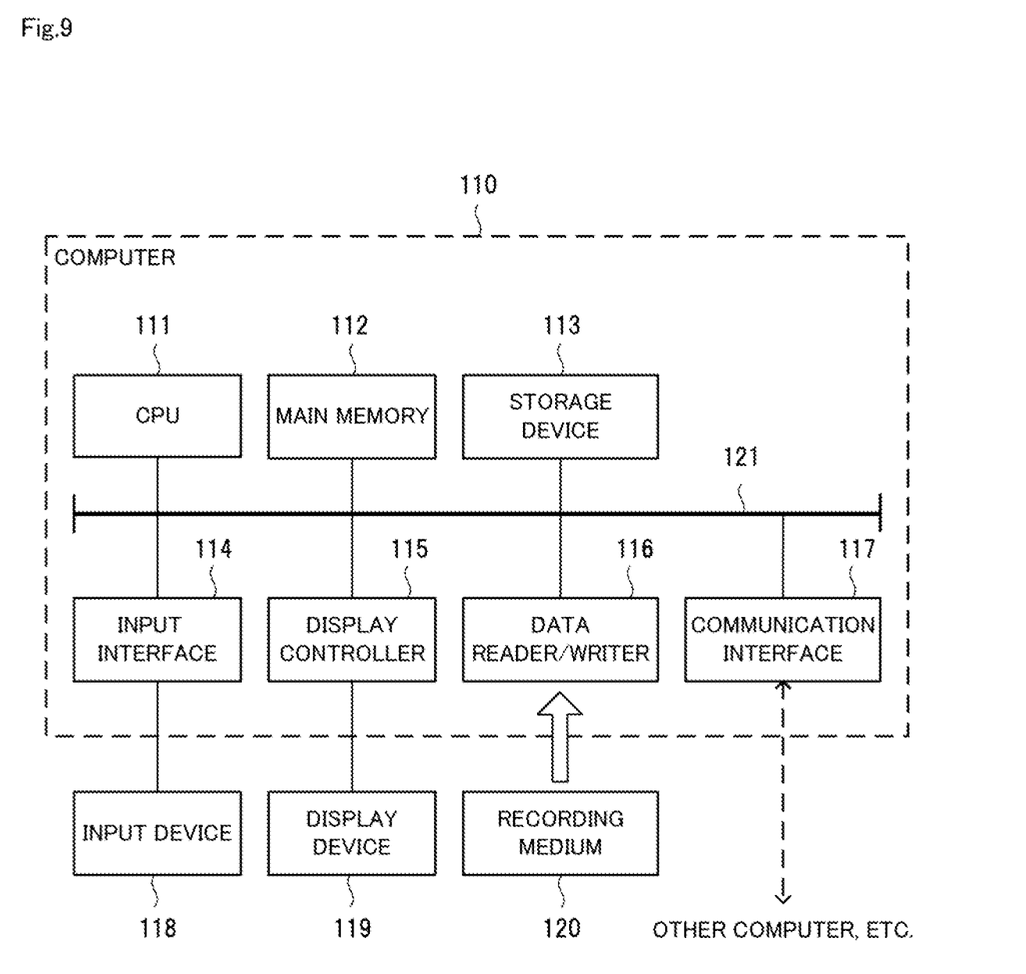
FIG. 9 is a diagram illustrating an example of a computer that realizes the abduction apparatus.

A description will now be given, with reference to FIG. 9, of a computer that realizes the abduction apparatus by executing the program according to the present example embodiment. FIG. 9 is a block diagram illustrating an example of a computer that realizes the abduction apparatus according to the present example embodiment of the present invention.

As shown in FIG. 9, a computer 110 includes a CPU 111, a main memory 112, a storage device 113, an input interface 114, a display controller 115, a data reader/writer 116, and a communication interface 117. These units are connected to each other via a bus 121 so as to be able to communicate data. Note that the computer 110 may also include, in addition to the CPU 111 or in place of the CPU 111, a GPU (Graphics Processing Unit), or an FPGA (Field-Programmable Gate Array).

The CPU 111 loads the program (codes) according to the present example embodiment that is stored in the storage device 113 to the main memory 112 and executes the program in a predetermined order, thereby performing various kinds of computation. The main memory 112 is typically a volatile storage device such as a DRAM (Dynamic Random Access Memory). The program according to the present example embodiment is provided in a state of being stored in a computer-readable recording medium 120. Note that the program according to the present example embodiment may also be distributed on the Internet to which the computer is connected via the communication interface 117.

Specific examples of the storage device 113 may include a hard disk drive, a semiconductor storage device such as a flash memory, and the like. The input interface 114 mediates data transmission between the CPU 111 and input devices 118 such as a keyboard and a mouse. The display controller 115 is connected to a display device 119 and controls a display in the display device 119.

The data reader/writer 116 mediates data transmission between the CPU 111 and the recording medium 120, reads out the program from the recording medium 120, and writes, in the recording medium 120, the results of processing performed by the computer 110. The communication interface 117 mediates data transmission between the CPU 111 and other computers.

Specific examples of the recording medium 120 may include a general-purpose semiconductor storage device such as a CF (Compact Flash (registered trademark)) or an SD (Secure Digital), a magnetic recording medium such as a Flexible Disk, and an optical recording medium such as a CD-ROM (Compact Disk Read Only Memory).

Note that the abduction apparatus 1 according to the present example embodiment may also be realized using hardware that corresponds to each of the units, rather than a computer in which the program is installed. Furthermore, the abduction apparatus 1 may be partially realized by a program, and the remainder may be realized by hardware.

[Supplementary Note]

In relation to the above example embodiment, the following Supplementary Notes are further disclosed. Part of, or the entire present example embodiment described above can be expressed by the following (Supplementary note 1) to (Supplementary note 12), but is not limited thereto.

(Supplementary Note 1)

An abduction apparatus including:
- a probability calculation unit configured to calculate, with respect to each of candidate hypotheses generated using observation information and knowledge information, a probability that the candidate hypothesis is an explanation regarding the observation information;
- a closed world assumption probability calculation unit configured to calculate, with respect to the candidate hypotheses, a closed world assumption probability that the candidate hypothesis is an explanation regarding a first-order predicate logic literal to which a new truth value is determined as a result of assuming a closed world assumption; and
- a solution hypothesis determination unit configured to determine a solution hypothesis that is a best explanation regarding the observation information from the candidate hypotheses using the probability and the closed world assumption probability.

(Supplementary Note 2)

The abduction apparatus according to supplementary note 1, further including:
- a candidate hypothesis deletion unit configured to delete a candidate hypothesis that includes a first-order predicate logic literal that has a dependency relationship with only one piece of the observation information, from the candidate hypotheses.

(Supplementary Note 3)

The abduction apparatus according to supplementary note 1 or 2,
- wherein the solution hypothesis determination unit, when calculating the probability and the closed world assumption probability by applying a probabilistic abduction model to the probability calculation unit and the closed world assumption probability calculation unit, multiplies the probability and the closed world assumption probability, and determines the candidate hypothesis regarding which the multiplied value is largest as the solution hypothesis.

(Supplementary Note 4)

The abduction apparatus according to supplementary note 3, further including:
- an output information generation unit configured to generate output information for outputting the observation information in which a new truth value is determined as false as a result of assuming the closed world assumption or the closed world assumption probability, or both of the items to an output device.

(Supplementary Note 5)

An abduction method, including:
- (a) a step of calculating, with respect to each of candidate hypotheses generated using observation information and knowledge information, a probability that the candidate hypothesis is an explanation regarding the observation information;
- (b) a step of calculating, with respect to the candidate hypotheses, a closed world assumption probability that the candidate hypothesis is an explanation regarding a first-order predicate logic literal to which a new truth value is determined as a result of assuming a closed world assumption; and
- (c) a step of determining a solution hypothesis that is a best explanation regarding the observation information from the candidate hypotheses using the probability and the closed world assumption probability.

(Supplementary Note 6)

The abduction method according to supplementary note 5, further including:
- (d) a step of deleting a candidate hypothesis that includes a first-order predicate logic literal that has a dependency relationship with only one piece of the observation information, from the candidate hypotheses.

(Supplementary Note 7)

The abduction method according to supplementary note 5 or 6,
- wherein, in the (c) step, when the probability and the closed world assumption probability are calculated by applying a probabilistic abduction model to the (a) step and the (b) step, the probability and the closed world assumption probability are multiplied, and the candidate hypothesis regarding which the multiplied value is largest is determined as the solution hypothesis.

(Supplementary Note 8)

The abduction method according to supplementary note 7, further including:
- (e) a step of generating output information for outputting the observation information in which a new truth value is determined as false as a result of assuming the closed world assumption or the closed world assumption probability, or both of the items to an output device.

(Supplementary Note 9)

A computer-readable recording medium that includes a program recorded thereon, the program causing the computer to carry out:
- (a) a step of calculating, with respect to each of candidate hypotheses generated using observation information and knowledge information, a probability that the candidate hypothesis is an explanation regarding the observation information;
- (b) a step of calculating, with respect to the candidate hypotheses, a closed world assumption probability that the candidate hypothesis is an explanation regarding a first-order predicate logic literal to which a new truth value is determined as a result of assuming a closed world assumption; and
- (c) a step of determining a solution hypothesis that is a best explanation regarding the observation information from the candidate hypotheses using the probability and the closed world assumption probability.

(Supplementary Note 10)

The computer readable recording medium that includes the program according to supplementary note 9 recorded thereon, the program further causing the computer to carry out:

(d) a step of deleting a candidate hypothesis that includes a first-order predicate logic literal that has a dependency relationship with only one piece of the observation information, from the candidate hypotheses.

(Supplementary Note 11)

The computer readable recording medium that includes the program according to supplementary note 9 or 10 recorded thereon, wherein, in the (c) step, when the probability and the closed world assumption probability are calculated by applying a probabilistic abduction model to the (a) step and the (b) step, the probability and the closed world assumption probability are multiplied, and the candidate hypothesis regarding which the multiplied value is largest is determined as the solution hypothesis.

(Supplementary Note 12)

The computer readable recording medium that includes the program according to supplementary note 11 recorded thereon, the program further causing the computer to carry out:

(e) a step of generating output information for outputting the observation information in which a new truth value is determined as false as a result of assuming the closed world assumption or the closed world assumption probability, or both of the items to an output device.

The invention of the present application has been described above with reference to the present example embodiment, but the invention of the present application is not limited to the above present example embodiment. The configurations and the details of the invention of the present application may be changed in various manners that can be understood by a person skilled in the art within the scope of the invention of the present application.

INDUSTRIAL APPLICABILITY

As described above, according to the present invention, a truth value can be assigned to a query logical formula without degrading the processing efficiency. The present invention is useful in a field in which explanation generation, situation understanding, or the like using a query logical formula and background knowledge is needed. Specifically, the present invention can be applied to a medical system, and an automatic system for performing legal advice, risk detection, or the like.

LIST OF REFERENCE SIGNS

1 Abduction apparatus
2 Probability calculation unit
3 Closed world assumption probability calculation unit
4 Solution hypothesis determination unit
5 Candidate hypothesis generation unit
6 Candidate hypothesis deletion unit
7 Output information generation unit
8 Output device
20 Storage device
31 Inference rule retrieval unit
32 Application determination unit
33 Inference rule application unit
D1 Query logical formula
D2 Background knowledge
D3a, D3b Candidate hypothesis set
D4 Solution hypothesis
110 Computer
111 CPU
112 Main memory
113 Storage device
114 Input interface
115 Display controller
116 Data reader/writer
117 Communication interface
118 Input devices
119 Display device
120 Recording medium
121 Bus

What is claimed is:

1. An abduction apparatus comprising:

at least one memory storing instructions; and at least one processor configured to execute the instructions to:

generate a candidate hypothesis using observation information and knowledge information, wherein the candidate hypothesis is a directed acyclic hypergraph having a first order predicate logic literal as a node, wherein the observation image is a conjunction of first-order predicate logic literals, and wherein the knowledge information, is an inference rule representing a set of an implication logical formula;

calculate, for each of the generated candidate hypotheses, a probability that the candidate hypothesis is an explanation regarding the observation information;

calculate, with respect to the candidate hypotheses, a closed world assumption probability, wherein the closed world assumption probability is a probability that the candidate hypothesis is an explanation regarding a first-order predicate logic literal to which a new truth value is determined as a result of assuming a closed world assumption; and determine a solution hypothesis from the candidate hypotheses using the probability and the closed world assumption probability, wherein the solution hypothesis is an explanation regarding the observation information.

2. The abduction apparatus according to claim 1, wherein the at least one processor is further configured to execute the instructions to delete a candidate hypothesis that includes a first-order predicate logic literal that has a dependency relationship with only one piece of the observation information, from the candidate hypotheses.

3. The abduction apparatus according to claim 1, wherein the at least one processor is further configured to execute the instructions to, when calculating the probability and the closed world assumption probability by applying a probabilistic abduction model to the probability calculation unit and the closed world assumption probability calculation unit, multiply the probability and the closed world assumption probability, and determine the candidate hypothesis regarding which the multiplied value is largest as the solution hypothesis.

4. The abduction apparatus according to claim 3, wherein the at least one processor is further configured to execute the instructions to generate output information for outputting the observation information in which a new truth value is determined as false as a result of assuming the closed world assumption or the closed world assumption probability, or both of the items to an output device.

5. The abduction apparatus according to claim 1, wherein the at least one processor is further configured to execute the instructions to generate a graph structure using the query logical formula, the candidate hypothesis, the closed world assumption probability, and the solution hypothesis; and
output the graph structure.

6. The abduction apparatus according to claim 5, wherein the at least one processor is further configured to execute the instructions to generate output information using the query logical formula;
convert the output information to an outputtable format; and
output the output information.

7. An abduction method, comprising:
generating a candidate hypotheses using observation information and knowledge information,
wherein the candidate hypothesis is a directed acyclic hypergraph having a first order predicate logic literal as a node,
wherein the observation information is a conjunction of first-order predicate logic literals, and
wherein the knowledge information is an inference rule representing a set of an implication logical formula;
calculating, for each of the generated candidate hypotheses, a probability that the candidate hypothesis is an explanation regarding the observation information;
calculating, with respect to the candidate hypotheses, a closed world assumption probability, wherein the closed world assumption probability is a probability that the candidate hypothesis is an explanation regarding a first-order predicate logic literal to which a new truth value is determined as a result of assuming a closed world assumption; and
determining a solution hypothesis from the candidate hypotheses using the probability and the closed world assumption probability, wherein the solution hypothesis is an explanation regarding the observation information.

8. The abduction method according to claim 7, further comprising:
deleting a candidate hypothesis that includes a first-order predicate logic literal that has a dependency relationship with only one piece of the observation information, from the candidate hypotheses.

9. The abduction method according to claim 7,
wherein, in the determining, when the probability and the closed world assumption probability are calculated by applying a probabilistic abduction model to the calculating the probability and the calculating the closed world assumption probability, the probability and the closed world assumption probability are multiplied, and the candidate hypothesis regarding which the multiplied value is largest is determined as the solution hypothesis.

10. The abduction method according to claim 9, further comprising:
generating output information for outputting the observation information in which a new truth value is determined as false as a result of assuming the closed world assumption or the closed world assumption probability, or both of the items to an output device.

11. A non-transitory computer-readable recording medium that includes a program recorded thereon, the program causing the computer to carry out:
generating a candidate hypotheses using observation information and knowledge information,
wherein the candidate hypothesis is a directed acyclic hypergraph having a first order predicate logic literal as a node,
wherein the observation information is a conjunction of first-order predicate logic literals, and
wherein the knowledge information is an inference rule representing a set of an implication logical formula;
calculating, for each of the generated candidate hypotheses, a probability that the candidate hypothesis is an explanation regarding the observation information;
calculating, with respect to the candidate hypotheses, a closed world assumption probability, wherein the closed world assumption probability is a probability that the candidate hypothesis is an explanation regarding a first-order predicate logic literal to which a new truth value is determined as a result of assuming a closed world assumption; and
determining a solution hypothesis from the candidate hypotheses using the probability and the closed world assumption probability, wherein the solution hypothesis is an explanation regarding the observation information.

12. The non-transitory computer readable recording medium that includes the program according to claim 11 recorded thereon, the program further causing the computer to carry out:
a step of deleting a candidate hypothesis that includes a first-order predicate logic literal that has a dependency relationship with only one piece of the observation information, from the candidate hypotheses.

13. The non-transitory computer readable recording medium that includes the program according to claim 11 recorded thereon,
wherein, in the determining, when the probability and the closed world assumption probability are calculated by applying a probabilistic abduction model to the calculating the probability and the calculating the closed world assumption probability, the probability and the closed world assumption probability are multiplied, and the candidate hypothesis regarding which the multiplied value is largest is determined as the solution hypothesis.

14. The non-transitory computer readable recording medium that includes the program according to claim 13 recorded thereon, the program further causing the computer to carry out:
generating output information for outputting the observation information in which a new truth value is determined as false as a result of assuming the closed world assumption or the closed world assumption probability, or both of the items to an output device.

* * * * *